(12) United States Patent
Johnson

(10) Patent No.: US 12,466,223 B1
(45) Date of Patent: Nov. 11, 2025

(54) TRAILER COUPLER SECURITY LOCK

(71) Applicant: Richard Johnson, LaGrange, KY (US)

(72) Inventor: Richard Johnson, LaGrange, KY (US)

(*) Notice: Subject to any disclaimer, the term of this patent is extended or adjusted under 35 U.S.C. 154(b) by 429 days.

(21) Appl. No.: 17/892,950

(22) Filed: Aug. 22, 2022

(51) Int. Cl.
*B60D 1/60* (2006.01)
*E05B 67/22* (2006.01)
*E05B 83/00* (2014.01)

(52) U.S. Cl.
CPC .............. *B60D 1/605* (2013.01); *E05B 67/22* (2013.01); *E05B 83/00* (2013.01)

(58) Field of Classification Search
CPC .......... E05B 67/22; E05B 67/36; E05B 67/38; E05B 67/383; E05B 2067/386; E05B 83/00; Y10T 70/5004; Y10T 70/40; B60D 1/06; B60D 1/60; B60D 1/605; B60R 25/00; B60R 25/001
See application file for complete search history.

(56) References Cited

U.S. PATENT DOCUMENTS

| | | | |
|---|---|---|---|
| 3,391,555 A * | 7/1968 | Mamo | B60D 1/60 280/507 |
| 4,571,964 A * | 2/1986 | Bratzler | B60D 1/60 280/507 |
| 4,620,718 A * | 11/1986 | Mickelson | B62D 53/085 280/507 |
| 5,063,759 A | 11/1991 | Nee et al. | |
| 5,195,339 A | 3/1993 | Nee et al. | |
| 6,070,441 A * | 6/2000 | Bernstrom | E05B 67/36 280/507 |
| 6,244,614 B1 * | 6/2001 | Bonvillain | B60D 1/60 280/507 |
| 6,360,571 B1 * | 3/2002 | O'Neal | B60R 25/09 70/53 |

(Continued)

FOREIGN PATENT DOCUMENTS

| | | | | |
|---|---|---|---|---|
| DE | 10061362 A1 * | 6/2002 | | B60D 1/60 |
| DE | 202015100509 U1 * | 6/2016 | | B60D 1/06 |

(Continued)

OTHER PUBLICATIONS

Espacenet machine translation of DE 10061362 A1, generated 24 Sep. 24, 2024 (Year: 2024).*

*Primary Examiner* — Kristina R Fulton
*Assistant Examiner* — Emily G. Brown
(74) *Attorney, Agent, or Firm* — Dinsmore & Shohl LLP

(57) ABSTRACT

A trailer coupler security lock includes a housing, locking component, and lock. The lock has a body and a shackle. The locking component has a body and retainer. The open lock shackle is inserted into the front access slot until the shackle contacts the short wall and then the locking component is inserted through the bottom access slot, through the lock shackle. The retainer is inserted into the locking component and secured by the retainer pin. In the unlocked state the locking component is held in the housing by the retainer. The trailer coupler security lock is transitioned to the locked state by inserting the locking component into the ball receiver of the trailer coupler until the locking component ledge contacts the short wall horizontal leg. The lock engages the body of the locking component by forcing the body onto the shackle, engaging the locking mechanism and the locking component.

26 Claims, 8 Drawing Sheets

(56) References Cited

U.S. PATENT DOCUMENTS

| | | | |
|---|---|---|---|
| 6,962,361 B1 * | 11/2005 | Price | B60D 1/60 |
| | | | 280/507 |
| 7,051,558 B2 * | 5/2006 | Mathers | E05B 73/0076 |
| | | | 70/237 |
| 7,107,799 B1 * | 9/2006 | Marley | B60D 1/60 |
| | | | 70/416 |
| 7,390,008 B1 * | 6/2008 | Hall | B60D 1/065 |
| | | | 280/507 |
| 8,556,288 B1 | 10/2013 | Bale | |
| 9,033,358 B1 | 5/2015 | Williamson | |
| 10,821,791 B2 | 11/2020 | Pritchard | |
| 2004/0083776 A1 * | 5/2004 | Rosenberg | B62D 53/085 |
| | | | 70/14 |
| 2005/0183474 A1 * | 8/2005 | Hillabush | B62D 53/085 |
| | | | 70/58 |
| 2008/0067783 A1 | 3/2008 | Rousseau | |
| 2010/0230932 A1 | 9/2010 | Pratt | |

FOREIGN PATENT DOCUMENTS

| | | | | |
|---|---|---|---|---|
| EP | 3815939 A1 * | 5/2021 | | B60D 1/60 |
| FR | 2609944 A3 * | 7/1988 | | |
| GB | 2210343 A * | 6/1989 | | B60D 1/60 |
| GB | 2221881 A * | 2/1990 | | B60D 1/60 |
| GB | 2236513 A * | 4/1991 | | B60D 1/60 |

* cited by examiner

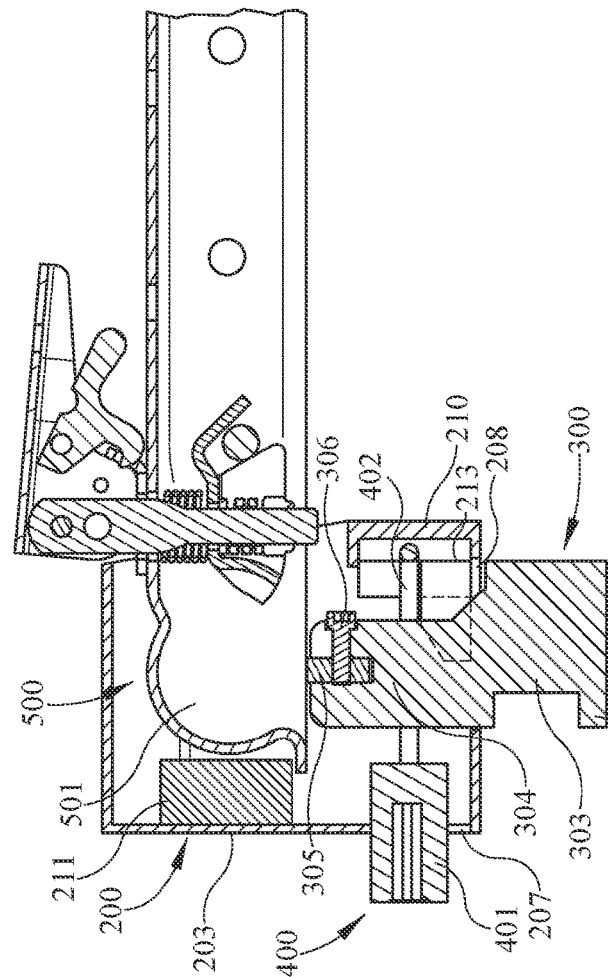
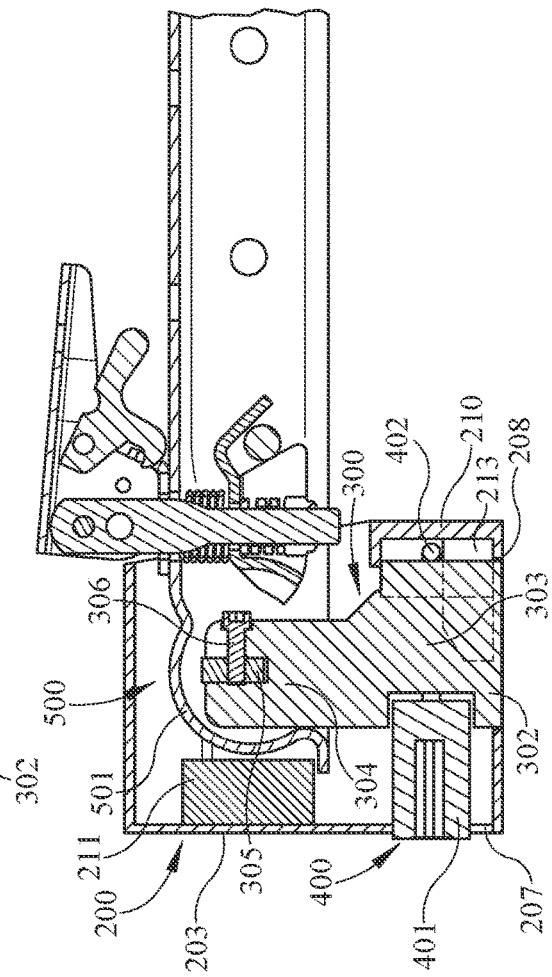
FIG. 4A
FIG. 4B

TRAILER COUPLER SECURITY LOCK

BACKGROUND

Trailers designed to be towed behind personal vehicles generally use a hitch system to attach the trailer to the vehicle. The hitch system includes components on the tow vehicle and components on the trailer. The tow vehicle components may include a receiver hitch, a ball mount, and a trailer ball. Trailer components may include a trailer coupler comprised of two sections, a ball receiver and a locking lever. This general setup allows for convenient and efficient usage, as any vehicle with the correct size trailer ball can hook up and tow the trailer.

Trailer owners will often use their trailers to store equipment and tools. This can be more inexpensive and more convenient than paying for commercial storage or building a garage or shed. Securing the trailer from unwanted outside access can be a difficult task. Some trailers have an exterior shell that can be locked like any other building, however the trailer can still be towed away and broken into later. Most trailers will provide a place for a lock to be placed on the locking lever to prevent theft, however this is often inadequate because a simple lock, primarily the shackle portion, can be quickly disabled with a variety of inexpensive and common tools.

Accordingly, a need exists in the art for a trailer coupler security lock that is durable and prevents tampering with the lock. Also, it is desired to provide such a trailer coupler security lock that may be able to be used on a wide variety of trailers.

SUMMARY

The herein-described embodiments address these and other problems associated with the art by providing a new trailer coupler security lock comprising a housing that fits over a trailer coupler; a locking component that may slide in and out of the bottom of the housing and rests on the inside of the trailer coupler when in the locked position; and a lock that slides into a slot on the front of the housing and is secured to the locking component.

In some embodiments, the housing is fabricated as a hollow volumetric solid having a front, rear, sides, bottom, a top, an interior, and an exterior. The front of the housing includes a slot to accommodate a lock. The rear of the housing includes a shortened wall with an access opening that allows the housing to slide on and off of the trailer coupler. The sides of the housing are solid with no access to the interior. The bottom of the housing includes a slot to accommodate the insertion of the locking component. The top of the housing may be flat, angular, curved, or any other shape that allows it to accommodate a variety of trailer couplers. The housing may be fabricated from steel, aluminum, stainless steel, or any other metal, alloy, material, or combination of materials that allows the housing to maintain structural durability and integrity.

In some embodiments, the locking component is a planar geometric solid that fits into the housing, comprising at least a body and a retainer. The body is sized to allow a shackle of a lock to be secured around it. The retainer is sized to prevent the locking component from falling though the access point of the housing it is inserted through. The locking component may be a variety of shapes, sizes, and materials that allow for the locking component to be inserted into the housing and for a lock to be secured to it. In general, the housing, the locking component, and the lock are all interlocked by the retainer, which prevents removal of the locking component or the lock from the housing without first removing the retainer.

In a depicted embodiment, the locking component comprises two pieces, a body and a locking component retainer, joined together by a retainer pin. The body of the locking component has three sections; a base section, a shackle retainer section, and a retainer receiver section. The base section is a flat and rectangular at the bottom of the body. The shackle retainer section is a generally rectangular prism with a section cut from the top rear corner and is the middle section of the body. The shackle retainer section is sized to allow a shackle of a lock to fit around it and to be secured to it. The retainer receiver section is the top section of the body. It is a generally rectangular prism with base that is angled on the bottom rear side such that a bottom portion of the rear face of the retainer receiver section is angled to meet the top rear edge of the shackle retainer section, and a vertical slot cut into the top for the locking component retainer piece. Pin holes are drilled into the retainer receiver section across the vertical slot.

In a depicted embodiment, the second piece of the locking component is the locking component retainer. The locking component retainer prevents the locking component from falling out of the housing. One example locking component retainer is a single piece of material fabricated into a T shape with a pin hole in the center and is attached to the body of the locking component retainer with a retainer pin. The top bar of the T-shaped locking component retainer protrudes from both sides of the body of the locking component retainer. The retainer pin may be a pin, screw, or other device used to attach the locking component retainer to the body of the locking component. In the depicted embodiment, the retainer pin is a screw.

In some embodiments, when the trailer coupler security lock is being installed, an opened lock is partially inserted into the slot in the front of the housing. The body of the locking component is then inserted through the slot on the bottom of the housing with the shackle of the lock now around the middle section of the body. The locking component retainer is then set into place and attached with the screw. The housing is slid onto the trailer coupler and the locking component is inserted all the way into the housing such that the retainer receiver section is inside of the ball receiver of the trailer coupler. The lock is then pushed against the rear wall of the housing causing it to lock in place, the bottom being flush with the slot on the front of the housing and only the key access being exposed.

These and other advantages and features, which characterize the invention, are set forth in the claims annexed hereto. For a better understanding of the invention, and of the advantages and objectives attained through its use, reference should be made to the Drawings, and to the accompanying descriptive matter, in which example embodiments are described. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIG. 4A is a side section view of the trailer coupler security lock of FIG. 1, wherein the housing is in place on the trailer coupler, in an unlocked state.

FIG. 4B is a side section view of the trailer coupler security lock of FIG. 1, wherein the housing is in place on the trailer coupler, in a locked state.

DETAILED DESCRIPTION

Figure 1:
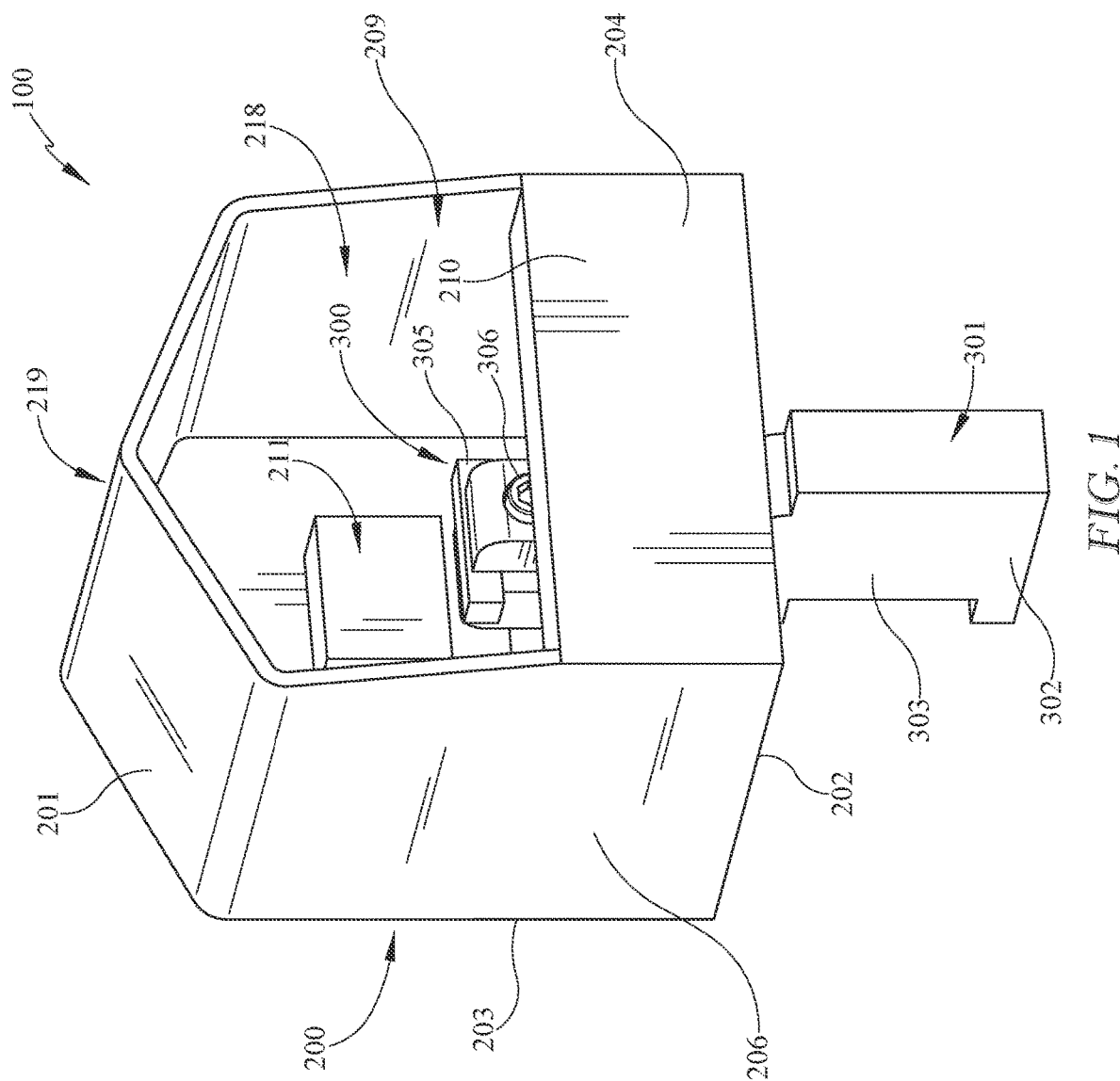
FIG. 1 is a rear perspective view of a trailer coupler security lock according to an embodiment, wherein a locking component is in place and secured with a lock.

The embodiments discussed hereinafter are directed in part to a trailer coupler security lock and a method for installing the same. The structures, features, and functionality of the disclosed apparatus are significant improvements over the prior art. The apparatus described herein provides a structure for a novel trailer coupler security lock and methods of installation. The embodiments shown and described include a trailer coupler security lock having a housing that is placed onto a trailer coupler, a locking component that slides into housing and into the trailer coupler, and a lock that slides into the front of the housing and secures to the locking component.

Turning now to the drawings, wherein like numbers denote like parts throughout the several views, the overall configuration of a trailer coupler security lock 100 will now be described with initial reference to the Figures, according to an embodiment. The Figures variously depict the trailer coupler security lock in both a locked and an unlocked state or position. Referring to FIGS. 3, 4A, 4B, 8A, and 8B in the embodiment shown, the trailer coupler security lock 100 may comprise a housing 200, a locking component 300, and a lock 400.

In the depicted embodiment, the housing 200 is a generally hollow volumetric solid with an interior 218 and an exterior 219. In the depicted embodiment, the housing 200 comprises a top 201, a bottom 202, a front 203, a rear 204, a left side 205, a right side 206, a front access slot 207, a bottom access slot 208, a rear access opening 209, a rear short wall 210, an anti-rotation block 211 and a shackle spacer 212. In other embodiments, the housing 200 may be fabricated into different shapes to make it compatible with different types of trailer coupler 500. For example, the top 201 may be flat or the sides 205 and 206 may be rectangular or rounded. The rear short wall 210 and the rear access opening 209 are sized in relation to the intended trailer coupler 500 such that when the trailer coupler security lock 100 is placed on the trailer coupler 500 there is limited horizontal or vertical movement of the trailer coupler security lock 100. The housing 200 can comprise the various pieces shown in the depicted embodiment, but can also comprises fewer separate pieces. For example, the sides 205, 206 and the top 201 can be formed from a single piece of material, such as by bending the single piece into a multi-sided shape. As used throughout this description, reference to any of the various sides or surfaces is not intended to require them to be separate pieces or components. When in use, the inside of the top 201 of the trailer coupler security lock 100 rests on top of a trailer coupler 500.

In the depicted embodiment, the bottom 202 of the housing 200 is rectangular and includes a bottom access slot 208. The bottom access slot 208 comprises an opening in the bottom 202 of the housing 200. In the depicted embodiment, the bottom access slot 208 is rectangular, however in other embodiments it may be any shape necessary to accommodate the locking component 300.

In the embodiment shown, the front 203 of the housing 200 is rectangular with an angled top and includes a front access slot 207 for the lock 400 to slide into. The front access slot 207 comprises a generally rectangular opening in the front 203 of the housing 200. The anti-rotation block 211 is coupled to the interior 218 of the front 203 of the housing 200; between the left side 205 and right side 206, positioned such that it is closer to the top 201 than the bottom 202 of the housing 200, between the top 201 of the housing 200 and the front access slot 207. As with the various ways of forming the top 201 and sides 205, 206, the front 203 and the bottom 202 also could be formed from a single piece of material, again by bending into a two-sided shape, if desired.

The left side 205 and right side 206 are generally rectangular, but with a discontinuity in the rear side such that a top portion angles toward the top 201. The rear 204 comprises two sections, the short wall 210 and the rear access opening 209. The short wall 210 comprises a vertical section that extends horizontally from the right side 206 to the left side 205, and an overhang coupled thereto on the inside. The short wall 210 is sized so that the rear access opening 209 is slightly larger than the trailer coupler 500. It also provides a backstop against which the shackle 402 of the lock 400 can bear when a user pushes the body 401 into the front access slot 207 of the housing 200 far enough to move the lock 400 into a locked condition, described in more detail below. In an alternative embodiment, a plate (not shown) can be coupled to the short wall 210 and that extends forwardly to contact the front 203. Such a plate could have an opening therethrough to allow the body 301 of the locking component 300 to pass through. Such opening could also be shaped to allow the locking component retainer 305 to pass through.

The lock 400, may be any one of a number of commonly used lock types with any number of commonly used locking mechanisms. In the depicted embodiment, the lock 400 is a standard padlock comprising a body 401, a locking mechanism 403, and a shackle 402. In other embodiments, the lock 400 may be, but is not limited to, a combination lock, a key lock, a magnetic lock, or an electronic lock, with the associated locking mechanisms 403. In the depicted embodiment, the lock 400 has a key locking mechanism 403.

In the depicted embodiment, the shackle spacer 212 comprises two spacer blocks 213 coupled to the interior 218 of the bottom 202 of the housing 200 on either side of the bottom access slot 208 and sidewalls 214 coupled to the spacer blocks 213. The spacer blocks 213 are generally rectangular prisms with a front face 215, an outside face 216, and a top face 217. The front face 215 is angled such that it ramps upwards towards the rear 204 of the housing 200. The outside face 216 is the face of the spacer block 213 opposite and perpendicular to the bottom access slot 208. The sidewalls 214 are coupled to the spacer blocks 213 outside face 216 and extend from the bottom 202 of the interior 218 of the housing 200 towards the top 201 of the housing 200 until they meet the short wall 210.

Figure 7:
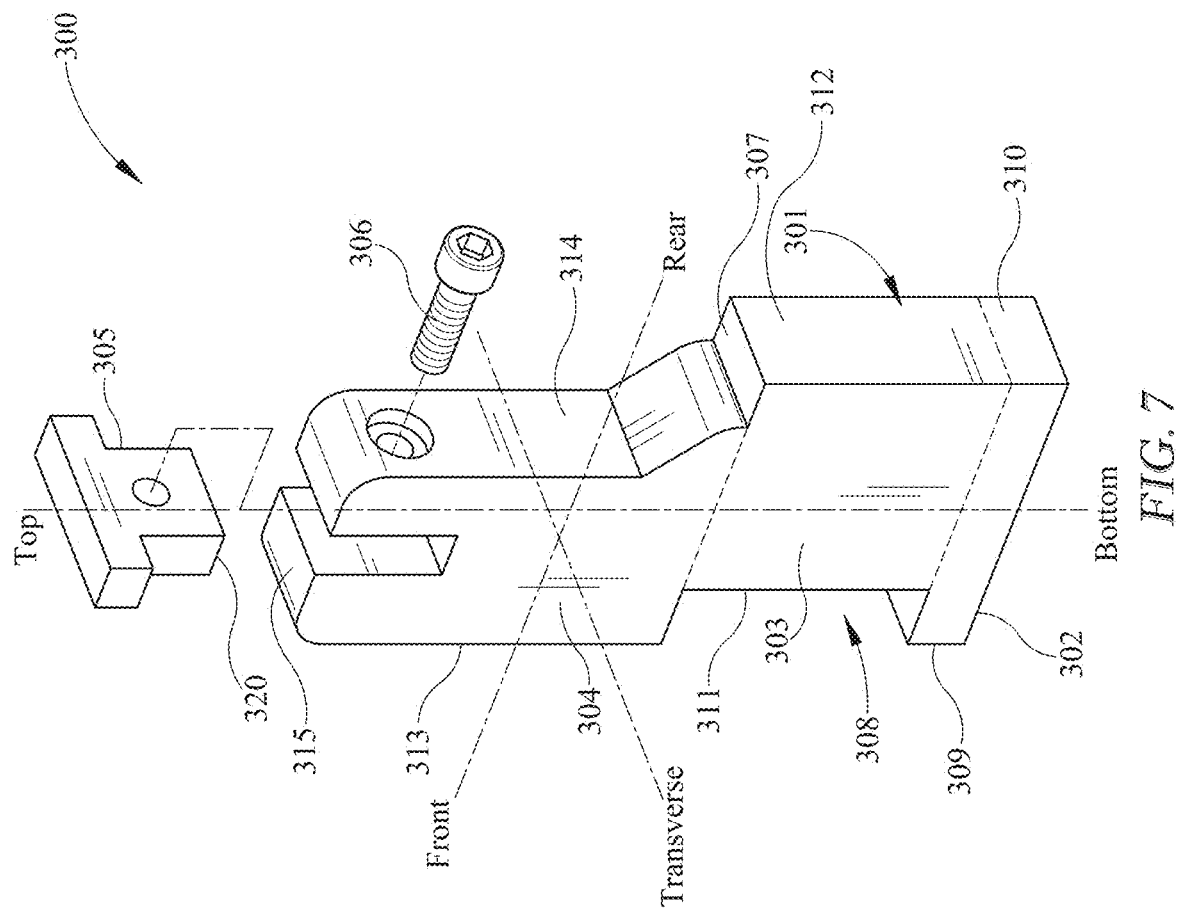
FIG. 7 is an exploded perspective side view of the disassembled components of the locking component of FIG. 1.
Figure 8B:
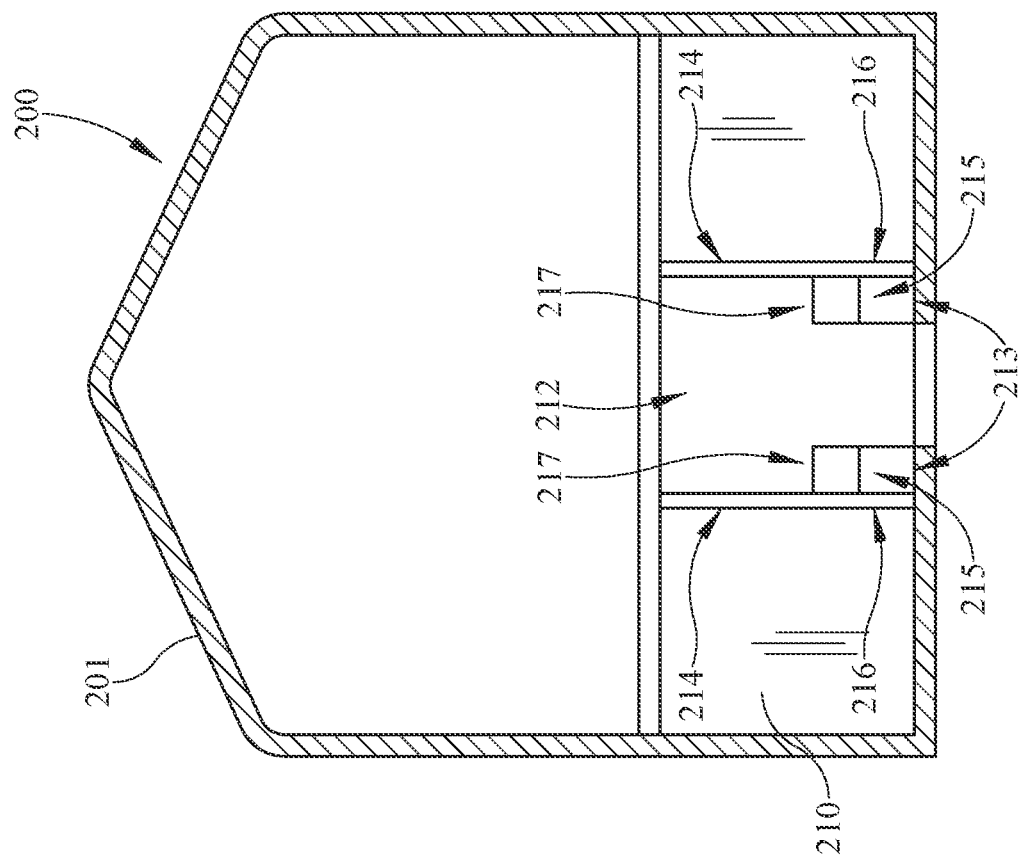
FIG. 8B is a front view of a trailer coupler security lock with the front removed for clarity.
Figure 8A:
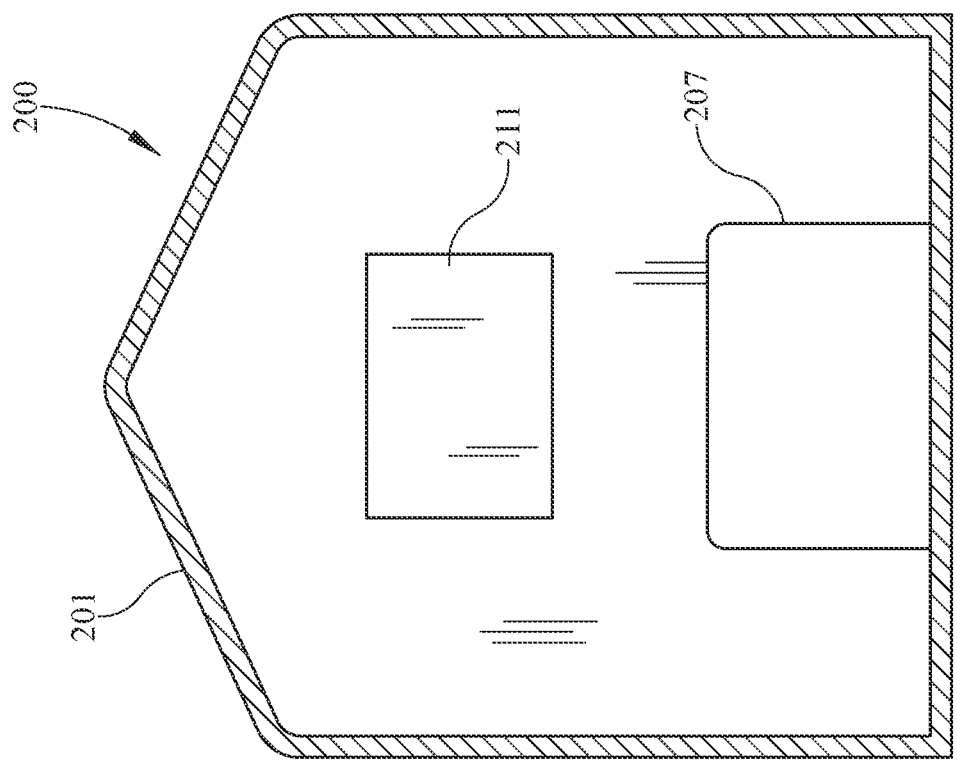
FIG. 8A is a rear view of a trailer coupler security lock with the short wall and shackle spacer removed for clarity.

The locking component 300 of the depicted embodiment, comprises a planar geometric shape that fits into the housing 200. The locking component may be of various shapes and sizes such that it will fit into a ball receiver 501 of a trailer coupler 500 and also so that a shackle 402 of a lock 400 may fit around it. In the depicted embodiment the locking component 300 comprises a planar geometric solid body 301, a locking component retainer 305, and a retainer pin 306. The body 301 of the locking component 300 may further comprise multiple sections having differing geometric shapes. These sections can include, but not be limited to, a base section 302, a shackle retainer section 303, and a retainer receiver section 304. In FIG. 7, dashed lines have been added to the body 301 to generally indicate these various sections.

With reference to FIG. 7, as used herein the terms "front", "rear", "top". "bottom", and "transverse" refer to the directions shown in FIG. 7. In the depicted embodiment, the base section 302 comprises a generally rectangular prism having at least a front face 309 and a rear face 310 and is located at the bottom of the body 301. The base section 302 has a first length from the front face 309 to the rear face 310. The base section 302 fits into the bottom access slot 208 such that there is no access to the interior 218 of the housing 200 when the trailer coupler security lock 100 is in the locked position.

In the depicted embodiment, the shackle retainer section 303 comprises a generally rectangular prism having a front face 311 and a rear face 312 with a second length in between the front face 311 and the rear face 312 and a third length distance between the front face 311 and the bottom end of the rear face 314 forming a ledge 307. The bottom portion of the rear face 312 of the shackle retainer section 303 is coplanar with the rear face 310 of the base section 302. The front face 311 of the shackle retainer section 303 is offset to the rear direction of the front face 309 of the base section 302 so that the second length of the shackle retainer section 303 is less than the first length of the base section 302. The shackle retainer section 303 is sized such that when the trailer coupler security lock 100 is in the locked position, the shackle 402 of the lock 400 is secured around the shackle retainer section 303, resting on the shackle spacer 212, the body 401 of the lock 400 is inside the of front access slot 207 of the housing 200.

In the depicted embodiment, the retainer receiver section 304 comprises a generally rectangular prism shaped geometric solid having a front face 313, a rear face 314 and a top face 315. The rear face 314 further comprises a top portion parallel with the front face 313 and a bottom portion that is angled between the top portion and the rear face 312 of the shackle retainer section 303 and terminates at a bottom end of the rear face 314. The distance between the front face 313 and the bottom end of the rear face 314 is a fourth length. The distance between the front face 311 and the top portion of the rear face 314 is a fifth length. The fourth length is larger than the fifth length and the fourth length is the same as the second length. Because the bottom end of the rear face 314 does not extend as far rearwardly as does the rear face 312, the ledge 307 is between the bottom end of the rear face 314 and the rear face 312. The front face 313 of the retainer receiver section 304 is coplanar with the front face 309 of the base section 302. An inlet 308 is formed where the front face 313 of the shackle retainer section 303 is offset to the rear of the locking component 300 as compared to the front face 309 of the base section 302 and the front face 313 of the retainer receiver section 304. The inlet 308 has a top to bottom length slightly larger than the top to bottom length of the body 401 of the lock 400 when inserted into the housing 200.

In the depicted embodiment, there is a slot cut across the transverse dimension of the top face 315 of the retainer receiver section 304 and a hole drilled through the rear face 314 towards the front face 313 across the slot that a retainer pin 306 fits into. The ledge 307 contacts the short wall 210 and prevents the locking component 300 from being inserted too far into the housing 200. The inlet 308 is where the body 401 of the lock 400 rests when the trailer coupler security lock 100 is in the locked state. While the trailer coupler security lock 100 is in the locked position, the lock is in a resting position that comprises the bottom face of the retainer receiver section 304 that is exposed at the top of the inlet 308, rests against the top face of the body 401 of the lock 400. This prevents the locking component 300 from falling out of the housing 200 through the bottom access slot 208.

The locking component retainer 305 is configured to attach to the body 301 of the locking component 300, preventing it from falling out of the bottom access slot 208 of the housing 200. In the depicted embodiment, the locking component retainer 305 is a T shape and may be secured to the body 301 of the locking component with a retainer pin 306. The retainer pin 306 may be a screw, as in the depicted embodiment, a pin, or any other device that may be used to secure the locking component retainer 305 to the body 301.

Figure 2:
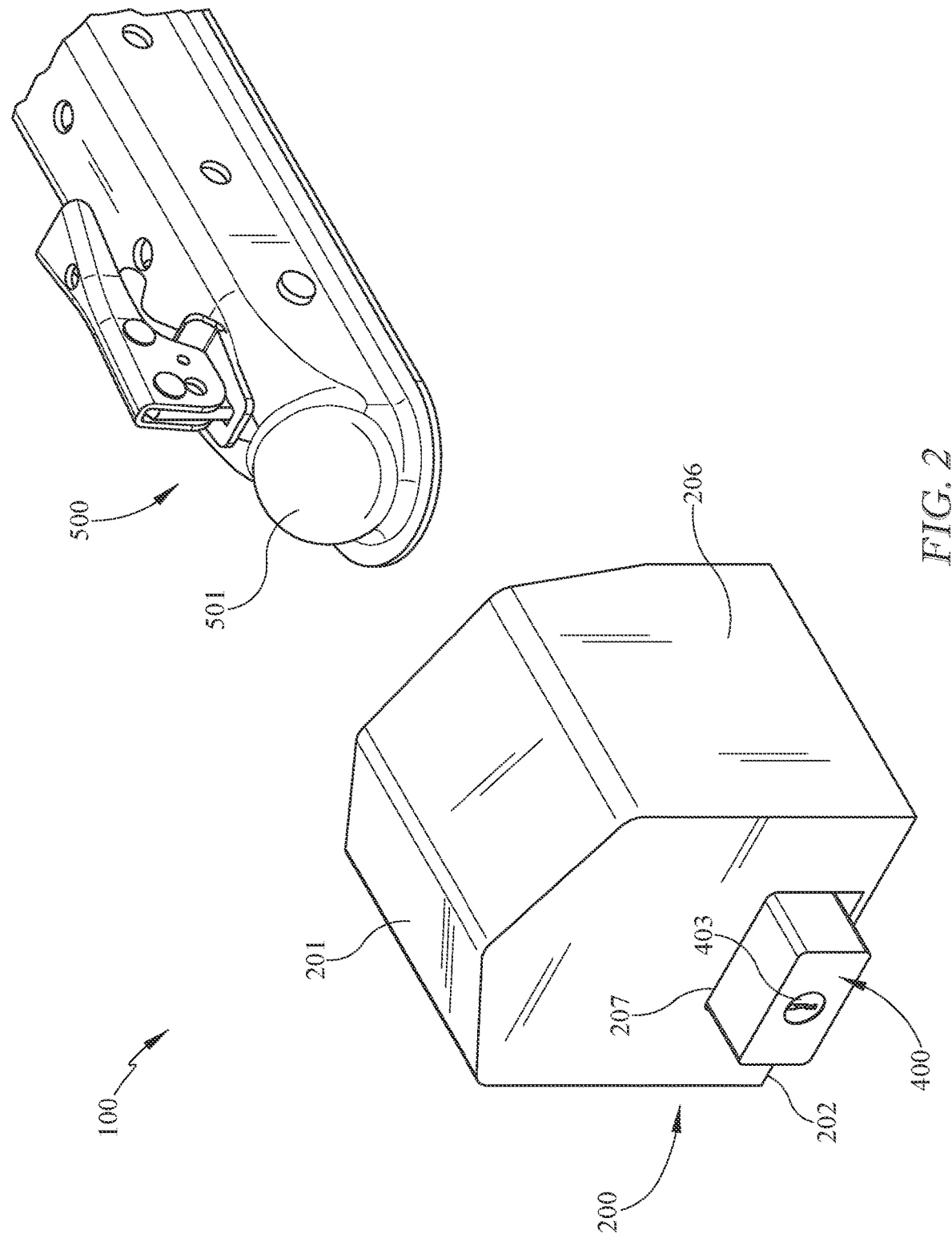
FIG. 2 is a top-front perspective view of the trailer coupler security lock of FIG. 1 showing a lock is secured inside the housing, prior to installation on a coupler.
Figure 3:
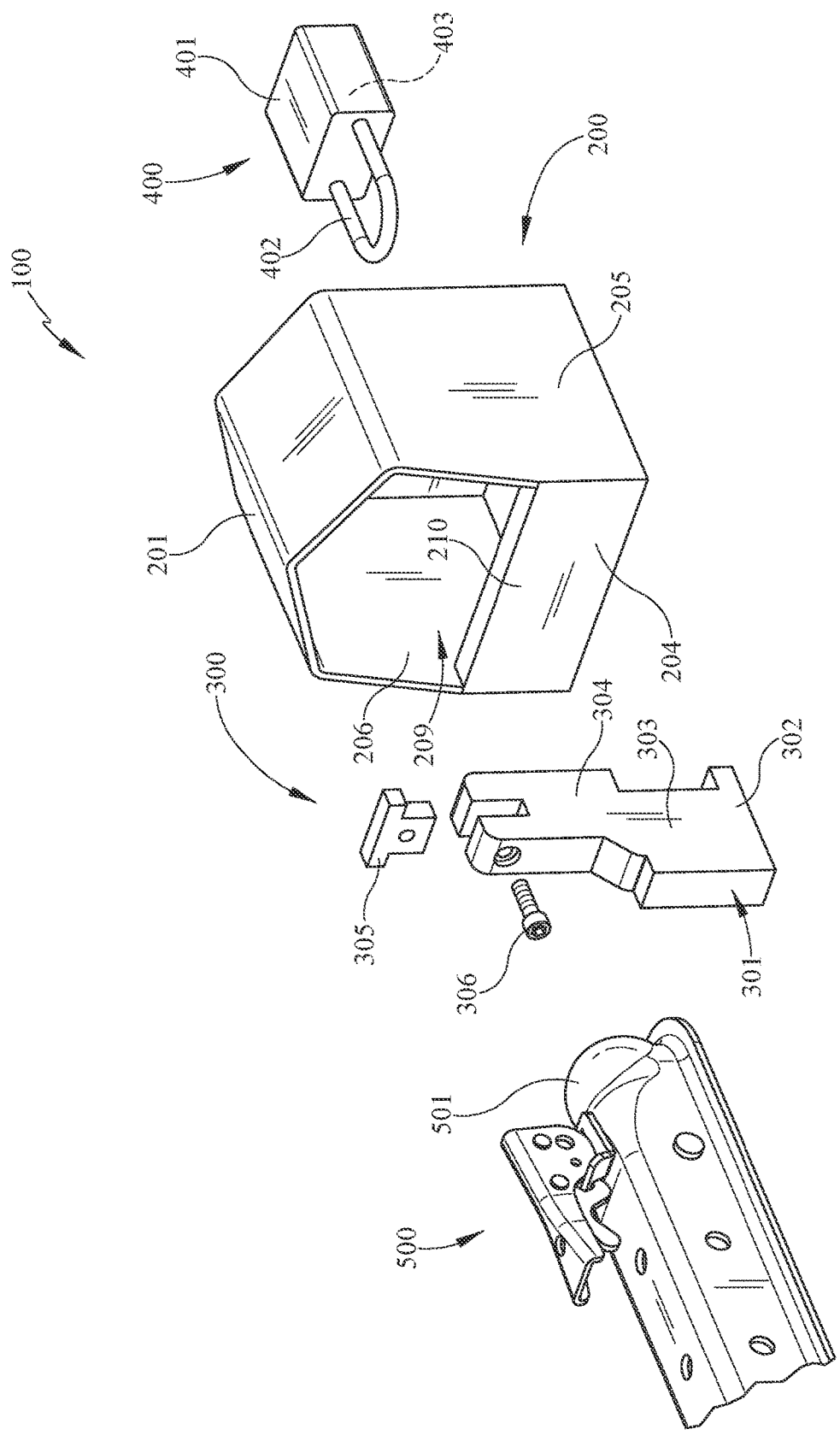
FIG. 3 is an exploded perspective rear view of the disassembled components of the trailer coupler security lock of FIG. 1.

FIGS. 1-2 depict the trailer coupler security lock 100 in the unlocked position without having been placed onto the trailer coupler 500. As described above, the trailer coupler security lock 100 has at least two states or conditions or positions: locked and unlocked. The locked state occurs when the locking component 300 is fully inserted into the housing 200 and the lock 400 is locked to the locking component 300. The unlocked state occurs when the locking component 300 is not fully inserted into the housing 200 through the bottom access slot 208, and the lock 400 is not secured to the locking component 300 and its locking mechanism 403 is not engaged.

In the depicted embodiment, when the trailer coupler security lock 100 is in the unlocked state, the locking component 300 is only partially inserted into the housing 200 so that the base section 302 partially protrudes from the bottom access slot 208. The body 401 of the lock 400 fills the front access slot 207. The lock 400 partially protrudes out of the front 203 of the housing 200 from the front access slot 207. In other embodiments, the lock 400 and locking component 300 may be sized differently and protrude, be recessed into, or flush with the housing 200 when the trailer coupler security lock 100 is in the locked state.

Figure 5:
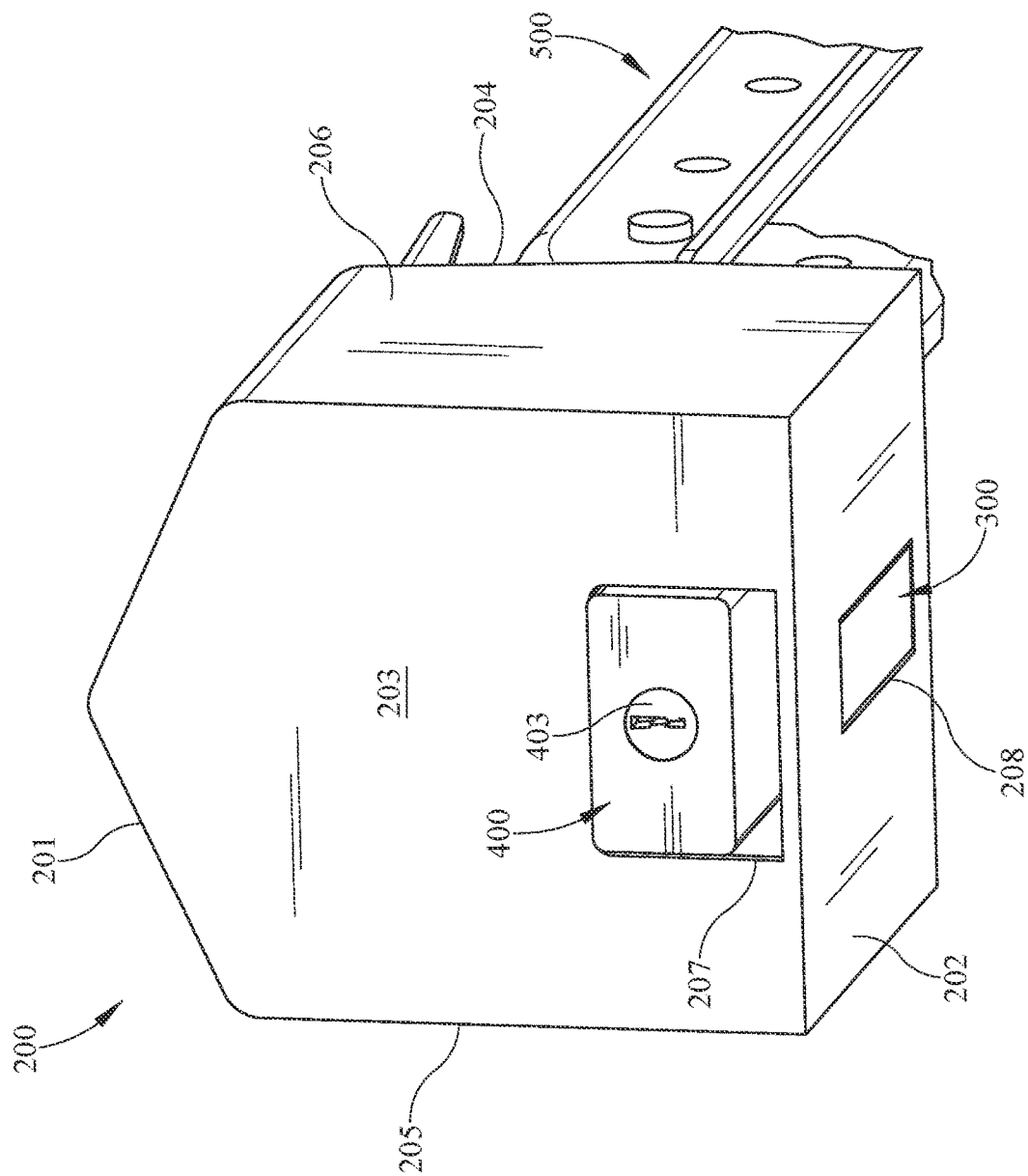
FIG. 5 is a bottom front perspective view of the trailer coupler security lock of FIG. 1 showing the lock secured inside the housing, in a locked state.
Figure 6:
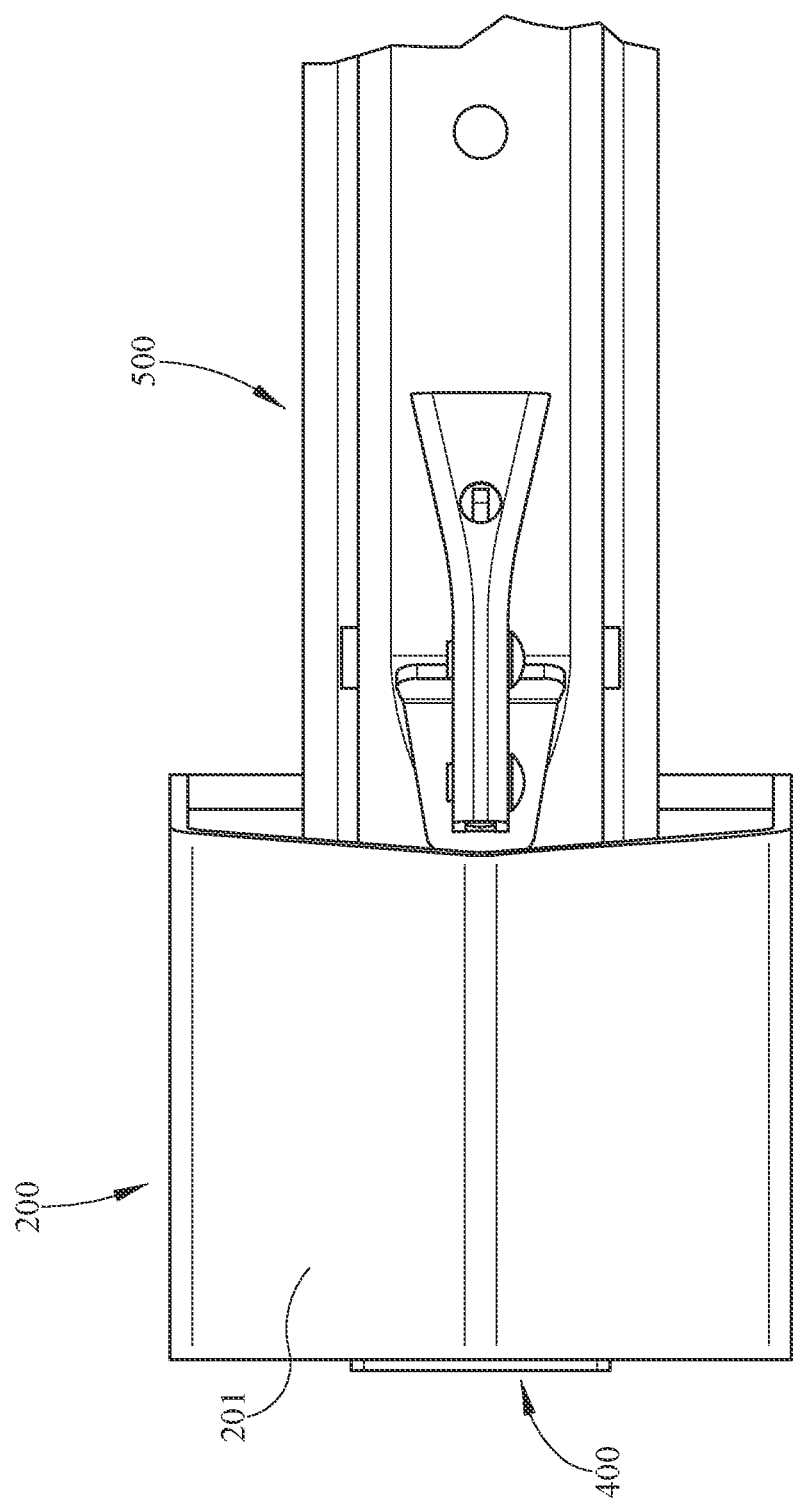
FIG. 6 is a top plan view of the trailer coupler security lock of FIG. 4, in a locked state.

FIGS. 4-6 depict the trailer coupler security lock 100 after it has been placed onto the trailer coupler 500. The trailer coupler security lock 100 may be in position on the trailer coupler 500 in either the locked or unlocked state. The trailer coupler security lock 100 is placed onto the trailer coupler 500 in the unlocked state after first partially inserting the shackle 402 of the lock 400 into the front access slot 207 of the housing 200. The shackle 402, when inserted into the front access slot 207, is in an unlocked state and resides above and borders the bottom access slot 208 of the housing 200. The shackle rests on the top face 217 of the spacer blocks 213 and is held in position by the sidewalls 214. The body 301 of the locking component 300 is then partially inserted into the housing 200 though the bottom access slot 208. The locking component retainer 305 is then put into place and secured with the retainer pin 306. The trailer coupler security lock 100 is then placed on the trailer coupler 500 by positioning the ball receiver 501 through the rear access opening 209 and into the housing 200. Positioning of the trailer coupler security lock 100 is complete when the locking component 300 is aligned with the ball receiver 501 and the anti-rotation block 211 rests against, or in close proximity to, the ball receiver 501. The housing 200 is aligned horizontally so that the trailer coupler 500 is centered in the housing 200. The interior 218 of the top 201 of the housing 200 rests on top of the trailer coupler 500.

FIG. 4A is a right section view of the trailer coupler security lock 100 in the unlocked state, wherein the housing 200 is in place on the trailer coupler 500 and the locking component 300 is partially inserted through the bottom access slot 208 into the housing 200, and the lock 400 is unsecure and partially inserted through the front access slot 207 into the housing 200. The shackle 402 of the lock rests against the top face 217 of the shackle spacer blocks 213 and is kept in place around the bottom access slot 208 by the sidewalls 214. In the depicted embodiment, the housing 200 is placed onto the trailer coupler 500 such that the bottom access slot 208 and the locking component 300 aligns vertically with the ball receiver 501.

The trailer coupler security lock 100 is transitioned from the unlocked state to the locked state, as depicted in FIG. 4B in a right section view of the trailer coupler security lock, by fully inserting the locking component 300 into the housing 200. After the locking component 300 is fully inserted into the housing 200, the body 401 of the lock 400 is pushed into the front access slot 207. The shackle 402 of the lock 400 is stopped against the vertical section of the short wall 210 at the rear 204 of the housing 200. As the body 401 of the lock 400 is pushed forward through the front access slot 207, the body 401 is forced onto the shackle 402 and engages the locking mechanism 403. The body 401 of the lock 400 rests in the resting position in the inlet 308. The shackle 402 of the lock 400 is secured around the shackle retainer section 303 of the locking component 300 rests on the shackle spacer 212. The retainer receiver section 304 of the locking component 300 rests inside the ball receiver.

The disclosed trailer coupler security lock 100 may be a variety of constructions, shapes, sizes, quantities, and positions and still accomplish the same intent. The elements depicted in the figures may not be drawn to scale and thus, the elements may have different sizes and/or configurations other than as shown in the figures.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications that the teachings is/are used for. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed.

Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one." in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements that the phrase "at least one" refers, whether related or unrelated to those elements specifically identified. Thus, as a non-limiting example, "at least one of A and B" (or, equivalently, "at least one of A or B." or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order that the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

What is claimed is:

1. A trailer coupler security lock comprising:
   a housing further comprising an open volumetric solid having a top, bottom, left side, right side, front, rear, interior, and exterior; wherein said front has a first access slot therein and said bottom has a second access slot therein, and wherein said rear further comprises a short wall and a rear access opening;
   a locking component further comprising a body and a retainer attachable to said body, wherein said locking component is configured to be insertable into said housing through said second access slot; and wherein said retainer is configured to couple to said body via a retainer pin insertable into said retainer through said body after said body has been inserted through said second access slot and to prevent removal of said body from said second access slot; and
   a lock having a shackle, a lock body, and a locking mechanism.

2. The trailer coupler security lock of claim 1 wherein said housing further comprises an anti-rotation block coupled to said interior of said housing and wherein said anti-rotation block is configured to rest against a trailer coupler when said housing is placed onto said trailer coupler.

3. The trailer coupler security lock of claim 1, wherein said housing further comprises a shackle spacer having blocks positioned around said second access slot and sidewalls coupled to said blocks, wherein said sidewalls are positioned around at least one side of said spacer blocks and extend from said bottom of said housing toward said top of said housing.

4. The trailer coupler security lock of claim 3, wherein said lock is configured to be insertable into said housing through said first access slot and configured to occupy an unlocked position and a locked position and wherein said shackle of said lock rests on top of said blocks of said shackle spacer.

5. The trailer coupler security lock of claim 4, wherein when said lock is in said unlocked position, said shackle and a first portion of said body are contained within said housing, and wherein when said lock is in said locked position, said shackle and a second portion of said body are contained within said housing.

6. The trailer coupler security lock of claim 5, wherein said second portion is greater than said first portion.

7. The trailer coupler security lock of claim 4, wherein said retainer, said lock, said locking component, and said housing are configured to be all interlocked.

8. The trailer coupler security lock of claim 1, wherein said body of said locking component further comprises a base section, a shackle retainer section, and a retainer receiver section, and wherein each of said base section, shackle retainer section, and retainer receiver section includes a rear side and a front side.

9. The trailer coupler security lock of claim 8, wherein said front side of said retainer receiver section and of said shackle retainer section and of said base section combine to create an inlet configured to receive a lock body therein.

10. The trailer coupler security lock of claim 8, wherein said rear side of said shackle retainer section and of said retainer receiver section combine to create a ledge on a top face of said shackle retainer section.

11. The trailer coupler security lock of claim 10, wherein said ledge contacts said short wall when said second locking component has been inserted through said access slot.

12. The trailer coupler security lock of claim 1, wherein said retainer is a T-shape.

13. A trailer coupler security lock, comprising:
    a housing further comprising a volumetric solid having a top, bottom, left side, right side, front, rear, interior, and exterior; wherein said front has a first access slot therein and said bottom has a second access slot therein, and wherein said rear further comprises a short wall and a rear access opening;
    a locking component further comprising a body and a retainer attachable to said body;
    wherein said body comprises a first section, a second section, and a third section; wherein said body has a front face and a rear face and a top face and a bottom face, and wherein said front face includes an offset therein in a direction toward said rear face, and wherein said rear face includes a ramped surface sloping in a direction toward said front face, and wherein said top face includes a slot therein parallel to said front face configured to receive said retainer; wherein said locking component is configured to be insertable into said housing through said second access slot; and wherein said retainer is configured to couple to said slot after said body has been inserted through said second access slot and to prevent removal of said body from said second access slot.

14. The trailer coupler security lock of claim 13 wherein said housing further comprises an anti-rotation block coupled to said interior of said housing and wherein said anti-rotation block is configured to rest against a trailer coupler when said housing is placed onto said trailer coupler.

15. The trailer coupler security lock of claim 13, further comprising a lock having a shackle, a lock body, and a locking mechanism.

16. The trailer coupler security lock of claim 15, wherein said body of said locking component further comprises said three sections wherein said first section is a base section, said second section is a shackle retainer section, and said third section a retainer receiver section, and wherein each of said base section, shackle retainer section, and retainer receiver section includes a rear side and a front side.

17. The trailer coupler security lock of claim 16, wherein said offset of said front face of said body towards said rear face comprises the front face of the shackle retainer section.

18. The trailer coupler security lock of claim 17, wherein said offset is configured to allow said body of said lock to be fully inserted into said housing.

19. The trailer coupler security lock of claim 16, wherein said rear side of said base section and of said shackle retainer section combine to create a ledge on a rear face of said shackle retainer section.

20. The trailer coupler security lock of claim 19, wherein said ledge contacts said short wall when said locking component has been inserted through said access slot.

21. The trailer coupler security lock of claim 15, wherein said retainer, said lock, said locking component, and said housing are configured to be all interlocked.

22. The trailer coupler security lock of claim 13 wherein said housing further comprises a shackle spacer having blocks positioned around said second access slot and sidewalls coupled to said blocks, wherein said sidewalls are positioned around at least one side of said spacer blocks and extend from said bottom of said housing toward said top of said housing.

23. The trailer coupler security lock of claim 13, wherein said locking component is configured to be insertable into said housing through said second access slot and configured to occupy an unlocked position and a locked position.

24. The trailer coupler security lock of claim 13, wherein said retainer is a T-shape.

25. A method of securing a trailer comprising:
providing a trailer coupler security lock with a housing and a locking component, said housing having a top, bottom, left side, right side, front, and rear; wherein said front has a first access slot therein and said bottom has a second access slot therein, and wherein said rear further comprises a short wall and a rear access opening; and said locking component having a body and a retainer attachable to said body, wherein said locking component is configured to be insertable into said housing through said second access slot; and wherein said retainer is configured to couple to said body after said body has been inserted through said second access slot and to prevent removal of said body from said second access slot;
providing a lock having a shackle, a lock body, and a locking mechanism;
inserting said shackle into said first access slot in an unlocked state;
inserting said locking component into said housing through said second access slot, wherein a portion of said locking component extends through said shackle;
coupling said retainer to said locking component;
placing said trailer coupler security lock onto a trailer by inserting a trailer coupler into said rear access opening;
positioning said housing over a ball receiver of said trailer coupler such that said housing rests on said trailer coupler;
further inserting said locking component into said housing such that said locking component is inside of said ball receiver; and
locking said lock by pushing said locking body toward said shackle, forcing said shackle against the rear of said housing, thus moving said locking body far enough to lock said lock.

26. The method of securing a trailer of claim 25, wherein the step of coupling said retainer to said locking component interlocks said retainer, said lock, said locking component, and said housing.

* * * * *